(12) United States Patent
Gardner et al.

(10) Patent No.: US 10,217,572 B2
(45) Date of Patent: Feb. 26, 2019

(54) LOW FREQUENCY CONVERTERS HAVING ELECTROCHEMICAL CAPACITORS

(71) Applicant: INTEL CORPORATION, Santa Clara, CA (US)

(72) Inventors: Donald S. Gardner, Los Altos, CA (US); Pavan Kumar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/479,189

(22) Filed: Apr. 4, 2017

(65) Prior Publication Data

US 2017/0207035 A1 Jul. 20, 2017

Related U.S. Application Data

(62) Division of application No. 13/853,960, filed as application No. PCT/US2012/031719 on Mar. 30, 2012, now Pat. No. 9,620,296.

(51) Int. Cl.
| | | |
|---|---|---|
| *G06F 1/04* | (2006.01) | |
| *G06F 1/32* | (2006.01) | |
| *H02J 7/00* | (2006.01) | |
| *H02M 3/07* | (2006.01) | |
| *H01G 11/04* | (2013.01) | |

(Continued)

(52) U.S. Cl.
CPC ............ *H01G 11/56* (2013.01); *G06F 1/04* (2013.01); *G06F 1/324* (2013.01); *H01G 11/04* (2013.01); *H02J 7/00* (2013.01); *H02M 3/07* (2013.01); *H02M 7/537* (2013.01); *H01G 11/08* (2013.01); *Y02E 60/13* (2013.01)

(58) Field of Classification Search
CPC ......... H01G 11/56; G06F 1/324; H02M 7/537
USPC ....................................................... 320/166
See application file for complete search history.

(56) References Cited

U.S. PATENT DOCUMENTS 4,184,197 A * 1/1980 Cuk ................... H02M 3/005
363/16
4,649,468 A 3/1987 Cubbison, Jr.
(Continued)

FOREIGN PATENT DOCUMENTS

| CN | 1503440 A | 6/2004 |
|---|---|---|
| TW | M240663 | 4/2003 |

(Continued)

OTHER PUBLICATIONS

Fang, Xiang, et al., "Analysis of Generalized Parallel-Series Ultracapacitor Shift Circuits for Energy Storage Systems", *Renewable Energy*, vol. 36, , Oct. 2011, pp. 2599-2604.

(Continued)

*Primary Examiner* — M Baye Diao
(74) *Attorney, Agent, or Firm* — Womble Bond Dickinson(US) LLP

(57) ABSTRACT

In one embodiment of the invention, a low frequency converter is described that includes a first electrochemical capacitor to charge to an input voltage and a second electrochemical capacitor that is coupled to the first electrochemical capacitor. The second electrochemical capacitor is associated with an output voltage of the low frequency converter. Each electrochemical capacitor may have a capacitance of at least one millifarad (mF) and a switching frequency that is less than one kilohertz.

19 Claims, 14 Drawing Sheets

(51) Int. Cl.
*H01G 11/56* (2013.01)
*G06F 1/324* (2019.01)
*H02M 7/537* (2006.01)
*H01G 11/08* (2013.01)

(56) References Cited

U.S. PATENT DOCUMENTS

| | | | |
|---|---|---|---|
| 5,132,606 A * | 7/1992 | Herbert | H02J 9/061 |
| | | | 323/266 |
| 6,198,645 B1 | 3/2001 | Kotowski | |
| 6,281,705 B1 | 8/2001 | Yu | |
| 6,462,963 B1 * | 10/2002 | Wittenbreder | H02M 1/34 |
| | | | 363/127 |
| 7,099,167 B2 | 8/2006 | Fujise | |
| 7,239,194 B2 * | 7/2007 | Azrai | H01L 23/50 |
| | | | 257/298 |
| 7,382,634 B2 | 6/2008 | Buchmann | |
| 7,808,220 B2 | 10/2010 | Rader | |
| 7,907,429 B2 | 3/2011 | Ramadass | |
| 7,907,430 B2 | 3/2011 | Kularatna | |
| 8,049,561 B2 | 11/2011 | Buter | |
| 8,258,741 B2 | 9/2012 | Wu | |
| 8,456,867 B1 * | 6/2013 | Karlsson | H02M 1/36 |
| | | | 323/901 |
| 2006/0255777 A1 * | 11/2006 | Koertzen | H02M 1/088 |
| | | | 323/272 |
| 2008/0291711 A1 | 11/2008 | Williams | |
| 2009/0219078 A1 | 9/2009 | Chu et al. | |
| 2013/0234785 A1 | 9/2013 | Dai | |
| 2014/0239719 A1 * | 8/2014 | Kumar | H02M 3/07 |
| | | | 307/31 |
| 2014/0268893 A1 * | 9/2014 | Henry | B23K 9/1006 |
| | | | 363/17 |
| 2015/0036389 A1 * | 2/2015 | Freeman | H02M 1/10 |
| | | | 363/16 |

FOREIGN PATENT DOCUMENTS

| | | |
|---|---|---|
| WO | WO-2005/002904 | 1/2005 |
| WO | WO-2011/123135 | 10/2011 |
| WO | WO-2013/048465 | 4/2013 |
| WO | WO-2013/066337 | 5/2013 |
| WO | WO-2013/089710 | 6/2013 |
| WO | WO-2013/095466 | 6/2013 |

OTHER PUBLICATIONS

"International Search Report and Written Opinion of the International Searching Authority", for PCT/US2012/031719, dated Nov. 28, 2012, 10 pages.

Desplobain, S., et al., "Investigations on Porous Silicon As Electrode Material", *Phys. Stat. Sol.*, vol. 4, pp. 2180-2184, May 9, 2007.

Kotz, R., et al., "Principles and Applications of Electrochemical Capacitors", *Electrochimica Acta*, vol. 45, issues 15-16, pp. 2483-2498, May 3, 2000.

Sharma, Pawan, et al., "A Review on Electrochemical Double-Layer Capacitors", *Energy Conversion and Management*, vol. 51, issue 12, pp. 2901-2912, Dec. 2010.

Zhang, Yong, et al., "Progress of Electrochemical Capacitor Electrode Materials: A Review", *International Journal of Hydrogen Energy*, vol. 34, issue 11, pp. 4889-4899, Jun. 2009.

Notification Concerning Transmittal of International Report on Patentability, for PCT/US2012/031719, dated Oct. 9, 2014, 7 pages.

* cited by examiner

LOW FREQUENCY CONVERTERS HAVING ELECTROCHEMICAL CAPACITORS

RELATED APPLICATIONS

This application is a divisional of U.S. patent application Ser. No. 13/853,960 filed on Mar. 29, 2013 and titled LOW FREQUENCY CONVERTERS HAVING ELECTROCHEMICAL CAPACITORS, which further claims the benefit of U.S. National Phase Application under 35 U.S.C. § 371 of International Application No. PCT/US2012/021719, filed Mar. 30, 2012, entitled LOW FREQUENCY CONVERTERS HAVING ELECTROCHEMICAL CAPACITORS, both of which are incorporated by reference in their entirety.

TECHNICAL FIELD

The disclosed embodiments of the invention relate generally to low frequency converters having electrochemical capacitors, and relate more particularly to low frequency converters having fixed ratios.

BACKGROUND

Modern societies depend on the ready availability of energy. As the demand for energy increases, devices capable of efficiently storing energy become increasing important. As a result, energy storage devices, including batteries, capacitors, electrochemical capacitors (ECs), (including pseudocapacitors and electric double-layer capacitors (EDLCs)—also known as ultracapacitors, among other names), hybrid ECs, and the like are being extensively used in the electronics realm and beyond. In particular, capacitors are widely used for applications ranging from electrical circuitry and power delivery to voltage regulation and battery replacement. Electrochemical capacitors are characterized by high energy storage capacity as well as other desirable characteristics including high power density, small size, and low weight, and have thus become promising candidates for the use in several energy storage applications.

There continues to be considerable interest in using more than one voltage in processor designs to reduce power consumption and pin count. High performance circuits can use a higher voltage versus a low voltage for low performance paths. However, voltage regulators (VR) contribute to significant power losses (20~50%) during very light load conditions.

BRIEF DESCRIPTION OF THE DRAWINGS

The disclosed embodiments will be better understood from a reading of the following detailed description, taken in conjunction with the accompanying figures in the drawings in which.

Figure 1:
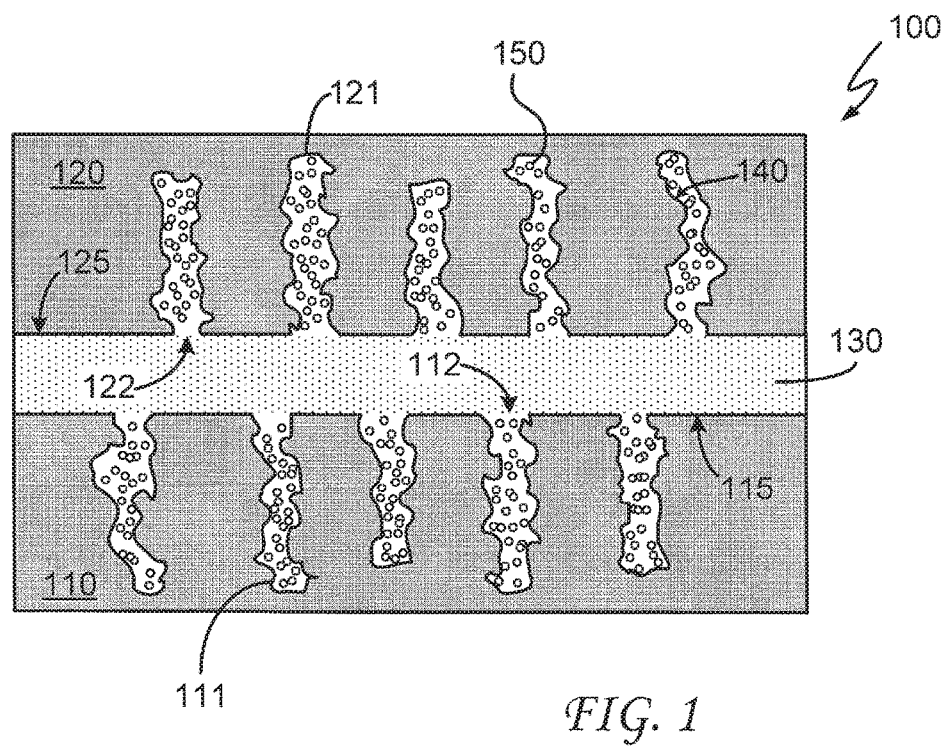
FIGS. 1-2 are cross-sectional side view illustrations of an energy storage device according to embodiments of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as including a series of steps, the order of such steps as presented herein is not necessarily the only order in which such steps may be performed, and certain of the stated steps may possibly be omitted and/or certain other steps not described herein may possibly be added to the method. Furthermore, the terms "include," "include," "have," and any variations thereof, are intended to cover a non-exclusive inclusion, such that a process, method, article, or apparatus that includes a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION

Voltage Regulators (VR) contribute to significant power losses (20~50%) during very light load conditions. There is a need to develop VR solutions that can operate very efficiently under extremely light load conditions. Embodiments of this invention provide a unique switched capacitor VR that uses a unique electrochemical capacitor with extremely low switching frequency to achieve the goal of reducing losses under light load conditions. A power converter circuit can be fabricated with electrochemical capacitors and designed with switching frequencies less than or equal to 1 kilohertz (e.g., less than 100 Hz, less than 10 Hz). This can reduce the losses from charging and discharging the capacitor. Typically more than 50% of the total platform power is consumed by voltage regulators at very light loads (e.g., typical standby conditions) due to switching losses that are proportional to capacitance*voltage2*switching frequency. The converter of the present disclosure, which works at very low switching frequencies (e.g., less than 100 Hz), can reduce the standby losses to very minimal values (e.g., less than 10% standby losses for the converter) resulting in very long battery life for mobile and handheld platforms. Monolithic integration can be achieved by using porous-Si electrochemical capacitors. Solid-state or gel electrolytes in the electrochemical capacitors simplifies the integration. An ultra-low effective series resistance (ESR) can be achieved by designing the porous silicon electrochemical capacitor with planar and shallow pores (e.g., 1 to 25 microns). For example, the ESR can have a range of 0.001 to 1 ohm. Additionally, a combination of this converter circuit with a buck converter can be used for improved efficiency and thereby reduce the size of the inductor needed for the buck converter. Alternatively, low frequency switched capacitors voltage doublers or voltage inverters can also be prepared using electrochemical capacitors.

The present design is different than prior approaches for converters in that the present design includes electrochemical capacitors with high capacitance (e.g., mFarads to Farads). Switching frequencies of the present design are significantly lower (e.g., less than 1 kHz) compared to hundreds of kHz to a few MHz for prior approaches. The low frequency converters do not have noise issues in contrast to high frequency converters that experience noise issues such as electromagnetic interference (EMI) or radio frequency interference. The present design can be applied to both platform level voltage regulators and to completely integrated on-die silicon level implementations.

In one aspect, versatile techniques simplify integration of energy storage devices onto packages or in the body of an electronic device. Such techniques may be used to apply an electrically conductive porous structure to various substrates and surfaces, and make thin energy storage devices for applications that need thin form factors. For example, in one embodiment, an energy storage device is integrated in the casing of a mobile electronics device.

The energy storage devices can be directly formed onto or transferred onto substrates used for packaging microelectronics with other microchips using materials such as porous silicon, graphene, carbon nanotubes, nanowires or other porous materials. The energy storage devices can be used to provide power for circuit functions such as turbo modes in microprocessors because they would be located closer to the microprocessors than other energy sources such as circuit-board capacitors. The energy storage device could also be part of a silicon bridge substrate. A conventional silicon bridge may be a passive substrate with conductive wiring connecting two die. The energy storage device may be formed on a silicon bridge connecting two die. In this manner, it may be possible to locate the energy storage device in close proximity to a microprocessor in order to quickly provide power to the microprocessor, for example during turbo mode.

Although much of the discussion herein will focus on electrochemical capacitors (including pseudocapacitors and electric double-layer capacitors), the "energy storage device" designation explicitly includes, in addition to ECs, hybrid ECs, as well as batteries, fuel cells, and similar devices that store energy. Energy storage devices according to embodiments of the invention can be used for a wide variety of applications, including in automobiles, buses, trains, airplanes, other transportation vehicles, home energy storage, storage for energy generated by solar or wind energy generators (especially energy harvesting devices), microelectronic devices, mobile electronic devices and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than of the dielectric of a conventional capacitor. The EDL is created by the electrochemical behavior of ions at an interface between a high-surface area electrode and an electrolyte, and results in an effective separation of charge in spite of the fact that the layers are so close together. (Physical separation distances are on the order of a single nanometer.) Thus, a typical EDL capacitor may be thought of as storing charge in its EDL. Each layer of the EDL is electrically conductive but the properties of the double layer prevent current from flowing across the boundary between them. (The EDL is further discussed below in connection with FIG. 4.)

As is true in conventional capacitors, capacitance in an EDL capacitor is proportional to the surface area of the electrodes and inversely proportional to the charge separation distance. The very high capacitances achievable in an EDL capacitor are due in part to the very high surface area attributable to the porous structure and to the nanometer-scale charge separation distance attributable to the EDL, which arises due to the presence of an electrolyte, as explained above.

Another class of electrochemical capacitor is the pseudocapacitor, where instead of EDL capacitance a different kind of capacitance—one that is Faradaic and not electrostatic in origin—can arise at certain types of electrodes. This different kind of capacitance is called "pseudocapacitance." Pseudocapacitors are energy storage devices that behave like capacitors but also exhibit reactions that result in charge storage. Typically, one of the electrodes of a pseudocapacitor is coated with a transition metal oxide such as $MnO_2$, $RuO_2$, $NiO_x$, $Nb_2O_5$, $V_2O_5$, etc., or with other materials including $Mo_2N$, $VN$, $W_2N$, $W_2C$ (tungsten carbide), $Mo_2C$, $VC$, a suitable conducting polymer, or a similar material. These materials can be used with an electrolyte such as potassium hydroxide (KOH); when the device is charged, the electrolyte will react with the material in a reaction that allows energy to be stored in a manner that has similarities to a battery's energy storage. More specifically, these materials store energy through highly-reversible surface and subsurface redox (Faradaic) reactions, but at the same time the electric double layer energy storage mechanism remains in place and provides the potential for high power.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

Figure 2:
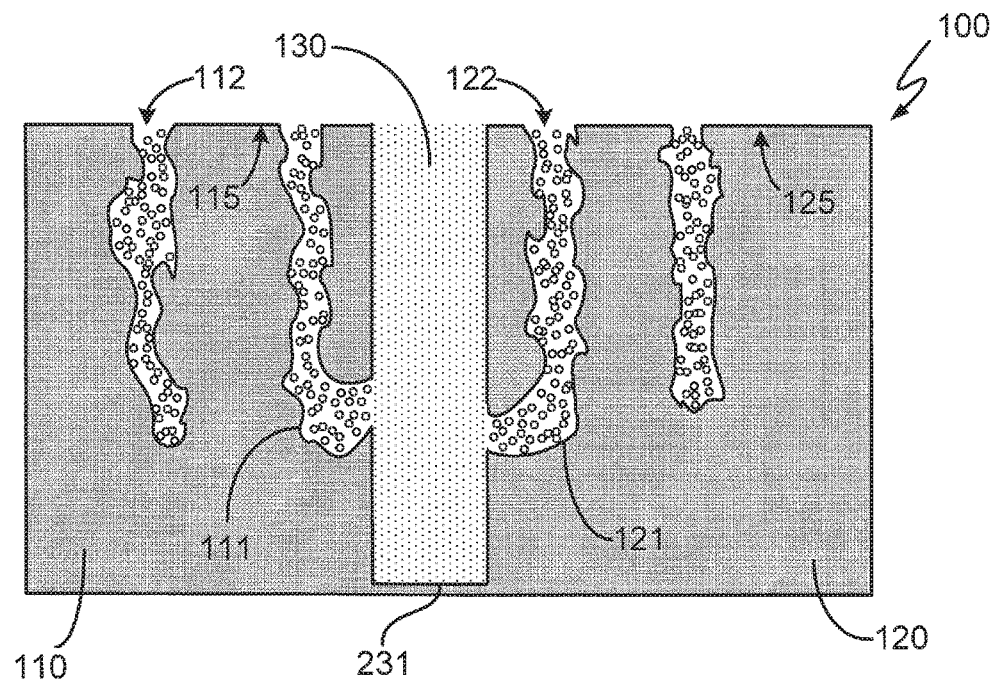

FIGS. 1-2 are cross-sectional views of an energy storage device 100 according to an embodiment of the invention. As illustrated in FIGS. 1 and 2, energy storage device 100 includes an electrically conductive structure 110 and an electrically conductive structure 120. At least one of electrically conductive structures 110 and 120 includes a porous structure. In the embodiment illustrated in FIGS. 1-2, both of the electrically conductive structures include an electrically conductive porous structure. In the particular embodiment illustrated, the porous structure contains multiple channels, each one of which has an opening to a surface of the porous structure. This feature may be the result of an electrochemical etching process, described below, used to form the porous structure. As an example, the porous structure may be formed within an electrically conductive material such as a conductive material or semiconductive material. Alternatively, the porous structure may be formed within an insulating material (e.g. alumina) that has been coated with an electrically conductive film (e.g., an ALD conductive film such as titanium nitride (TiN)). In this regard, materials having greater electrical conductivity are advantageous because they lower the effective series resistance. In the illustrated embodiments both electrically conductive structure 110 and electrically conductive structure 120 include such a porous structure. Accordingly, in some embodiments electrically conductive structure 110 includes channels 111 with openings 112 to a surface 115 of the corresponding porous structure and electrically conductive structure 120 includes channels 121 with openings 122 to a surface 125 of the corresponding porous structure. In an embodiment where only one of electrically conductive structures 110 and 120 includes a porous structure with multiple channels, the other electrically conductive structure can be, for example, a metal electrode or a polysilicon structure. In other embodiments, the porous structure has a different morphology than that illustrated in FIGS. 1-2, which may be the result of, for example, an aerogel or electrospinning technique.

As just described, in an embodiment, an electrically conductive porous structure is formed within the electrically conductive structure by electrochemical etching. Where the electrically conductive substrate is silicon, the electrochemical etching bath solution may include hydrofluoric acid (HF) or HF-ethanol solutions, for example. Where electrochemical etching is utilized to form the porous structure in an electrically conductive structure, the electrically conductive structure can be provided by a variety of manners. For example, the electrically conductive structure can be a portion of a silicon wafer, or layer of silicon deposited on a substrate. The silicon can be grown using techniques such as epitaxial deposition and chemical vapor deposition (CVD). In an embodiment, less expensive methods may be employed in which the silicon layer can be deposited on a variety of substrates and surfaces. In an embodiment, thermal spraying (e.g. plasma spraying) of silicon particles can be utilized to form a silicon layer. In an embodiment, the silicon particles are poly-crystalline. In another embodiment, casting techniques can be utilized to form a silicon layer of silicon particles. Besides silicon, other materials may also be used such as porous germanium and porous tin. Possible advantages of using porous silicon include its compatibility with existing silicon technology. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge—which is an undesirable result.) Porous germanium is also highly compatible with silicon technology. Possible advantages of using porous tin, which is a zero-band-gap material, include its enhanced conductivity with respect to certain other conductive and semiconductive materials. Other materials may also be used for the porous structure, including silicon carbide, alloys such as an alloy of silicon and germanium, and metals such as copper, aluminum, nickel, calcium, tungsten, molybdenum, and manganese.

In an embodiment, an electrically conductive porous structure is formed with an aerogel technique. For example, a gel can be deposited onto a substrate, and then a liquid component is extracted from the gel via processes such as supercritical drying and freeze-drying. Aerogel adhesion to the substrate can be achieved by using controlled texturing of the substrate surface. Materials which may be suited for formation of the electrically conductive porous structure with an aerogel technique include silicon, carbon, vanadium, molybdenum, ruthenium, and manganese. A possible advantage for using such a drying process is that use of low temperature processing may be compatible with polymers used in microelectronics packaging. In an embodiment, an electrically conductive porous structure is formed using a thick photoresist and electrospinning conductive nanostructures (e.g. carbon nanotubes) onto a substrate.

Various configurations of energy storage device 100 are possible. In the embodiment of FIG. 1, for example, energy storage device 100 includes two distinct electrically conductive porous structures (that is, electrically conductive structure 110 and electrically conductive structure 120) that have been bonded together face-to-face with separator 130 in between these structures. As another example, in the embodiment of FIG. 2 energy storage device 100 includes a single planar electrically conductive porous structure in which a first section (electrically conductive structure 110) is separated from a second section (electrically conductive structure 120) by a trench 231 containing separator 130. One of the electrically conductive structures will be the positive side and the other electrically conductive structure will be the negative side.

FIG. 2 shows a small bridge of material connecting electrically conductive structure 110 and electrically conductive structure 120. If left unaddressed, this bridge may act as an electrical short between the two electrically conductive structures. There are several possible solutions, however. For example, the bridge may be removed using a polishing operation. The conductive structure may then be held apart by some other means or by the separator 130 in accordance with embodiments of the invention. Alternatively, the electrically conductive structures may be formed in a heavily-doped top layer or region of a wafer while the trench extends down to an underlying lightly-doped substrate that is not a very good conductor. Alternatively, further processing may be performed on the bridge to make it less conductive such as an oxidation step, or a silicon-on-insulator structure may be used.

It should also be noted that the depictions of the porous structures in FIGS. 1-2 are highly idealized in that, to mention just one example, all of channels 111 and 121 are shown as only extending vertically. In reality the channels would branch off in multiple directions to create a tangled, disorderly pattern that may look something like the porous structure shown in FIG. 4B.

Figures 4A, 4B:
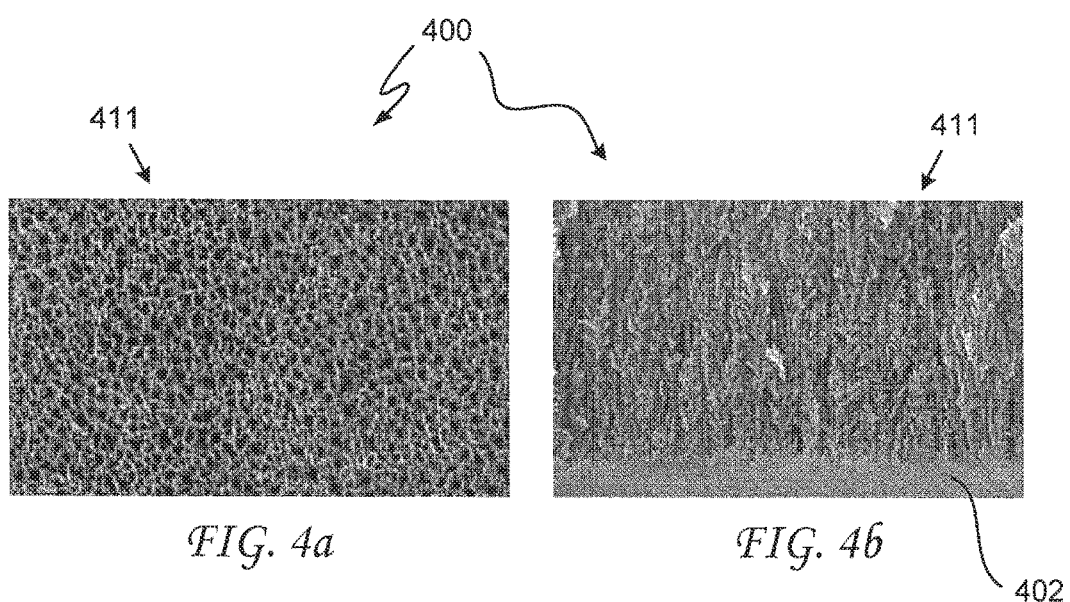
FIGS. 4A-4B are cross-sectional side view scanning electron microscope images of a piece of porous silicon according to an embodiment of the invention.

FIG. 4B is a cross-sectional side view scanning electron microscope (SEM) image 400 of a porous silicon layer. A silicon layer is electrochemically etched to form a porous silicon structure according to an embodiment of the invention. In the embodiment illustrated in FIG. 4B, a layer 402 of un-etched silicon remains underneath the etched porous silicon structure 411. In one embodiment, un-etched layer 402 acts as a support structure for porous structure 411 (and for the corresponding energy storage device, not shown). FIG. 4A is a top view SEM image 400 of the porous silicon structure 411 that is shown in FIG. 4B.

Referring again to FIGS. 1-2, the separator 130 prevents the physical contact of anode and cathode (which would cause an electrical malfunction in the device) while permitting the transfer of ionic charge carriers. For example, separator 130 could be a permeable membrane or other porous polymer separator. In addition to polymer separators, several other separator types are possible. These include nonwoven fiber sheets, liquid membranes, polymer electrolytes, solid ion conductors, and the like. Separator 130 may be a solid or semi-solid (e.g. gel) material which provides structural rigidity to the energy storage device 100. In an embodiment, separator 130 is a solid or semi-solid electrolyte which both permits the transfer of ionic charge carriers and prevents physical contact of the two conductive structures. In an embodiment, the solid or semi-solid electrolyte separator 130 penetrates into the porous structure of at least one of the electrically conductive structures 110, 120 as illustrated in FIGS. 1-2 and described in more detail in the following paragraphs. In this manner, in addition to providing the role of a spacer, separator 130 may also provide additional load bearing structural stability to the energy storage device 100 by virtue of intermixing or chemical bonding with electrolyte 150 and/or additional mechanical interlocking or chemical bonding with the porous structure. In an embodiment, the solid or semi-solid electrolyte includes a polymer matrix which provides structural rigidity. To provide additional ionic transfer, an ionic liquid can be mixed with the polymer matrix in the separator 130. The polymer matrix may also include a co-polymer. For example, the co-polymer can include a first polymer to provide a structural backbone of the polymer matrix, and a second polymer to provide increased ionic conductivity. As an example, the co-polymer can include a polyimide backbone and polyethylene oxide for ionic conductivity. In an embodiment, the molecular weight of the polyimide is higher than the molecular weight of the polyethylene oxide.

Also illustrated in FIGS. 1-2 is an electrolyte 150, which gives rise to the EDL. In some embodiments electrolyte 150 is organic. One type of electrolyte that may be used in accordance with embodiments of the invention is an ionic solution (liquid or solid). Another is an electrolyte (e.g., Li2SO4, LiPF6) including an ion-containing solvent. As one example, the electrolyte can be a liquid or solid solution of organic materials such as tetraethylammonium tetrafluoroborate in acetonitrile. Other examples include solutions based on boric acid, sodium borate, or weak organic acids. Organic electrolytes and solid-state electrolytes are also possible. In a particular embodiment, electrolyte 150 is a liquid electrolyte solution, and separator 130 is a solid or semi-solid electrolyte. However, electrolyte 150 may also be the same material used to form separator 130. Electrolyte 150 and the solid or semi-solid electrolyte separator 130 are represented in the drawings using a random arrangement of circles and dots, with electrolyte 150 being represented by un-filled circles and solid or semi-solid electrolyte separator 130 represented by dots. This representation is intended to convey the idea that the electrolytes 130, 150 are substances (liquid or solid, including gel-like materials) containing free ions. The circles and dots were chosen for convenience and are not intended to imply any limitation as to the components or qualities, including any limitation with respect to the size, shape, or number of the ions. The circles and dots were also chosen to clearly illustrate penetration of the solid or semi-solid electrolyte separator 130 into the porous structures of the electrically conductive structure 110, 120, as well as the possibility of penetration of electrolyte 150 into the solid or semi-solid electrolyte separator 130. In the particular embodiment illustrated in FIGS. 1-2, the electrolytes 130, 150 are illustrated as intermixing in the regions at the surfaces 115, 125 of the channels 111, 121 (or pores). In accordance with embodiments of the invention, the amount of intermixing of electrolytes 130, 150 can be controlled. For example, in another embodiment, electrolyte 130 (represented by the dots) penetrates a substantial portion of the channels 111, 121 (or other porous structure), and may even completely penetrate the channels 111, 121 (or other porous structure). Likewise, the electrolyte 150 (represented by the un-filled circles) penetration into electrolyte 150 can be controlled.

Figure 3:
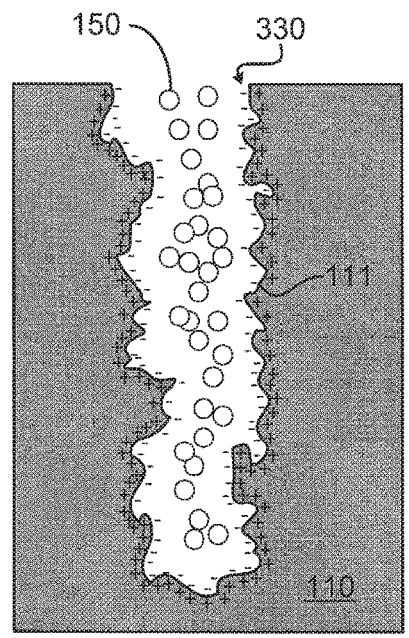
FIG. 3 is a cross-sectional side view illustration of an electric double layer within a porous structure of an energy storage device according to an embodiment of the invention.

FIG. 3 schematically depicts an electrical double layer (EDL) 330 formed within one of channels 111 with electrolyte 150. It is to be appreciated that while only electrolyte 150 is shown within the channel 111, that electrolyte 130 may also be present within the channel 111 and contribute to the EDL depending upon the amount of penetration. EDL 330 is made up of two layers of charge, one of which is the electrical charge of the sidewalls of channel 111 (depicted as being positive in FIG. 3 but which could also be negative) and the other of which is formed by free ions in the electrolyte. EDL 330 electrically insulates the surface, thus providing the charge separation necessary for the capacitor to function. The large capacitance and hence energy storage potential of EDLCs arises due to the small (approximately 1 nm) separation between electrolyte ions and the electrode surface charge.

Referring again to FIGS. 1-2, energy storage device 100 may further include an electrically conductive coating 140 on at least a portion of the porous structure and in at least some of channels 111 and/or channels 121. Such an electrically conductive coating may be necessary in order to maintain or enhance the conductivity of the porous structure, or it may be helpful in reducing ESR, thereby improving performance. For example, a device having lower ESR is able to delivery higher power (which may be manifested in terms of greater acceleration, more horse power, etc.). In contrast, higher ESR (a condition that prevails inside a typical battery) limits the amount of available energy, at least partially due to the fact that much of the energy is wasted as heat. As an example, electrically conductive coating 140 may be a silicide. As another example, electrically conductive coating 140 may be a coating of metal such as, for example, aluminum, copper, and tungsten, or other electrical conductors such as tungsten nitride, titanium nitride, tantalum nitride, and vanadium nitride. Each of the listed materials has the advantage of being used in existing CMOS technology. Other metals such as nickel and calcium may also be used as electrically conductive coating 140. These materials may be applied using processes such as electroplating, chemical vapor deposition (CVD), and/or atomic layer deposition (ALD).

Figure 5:
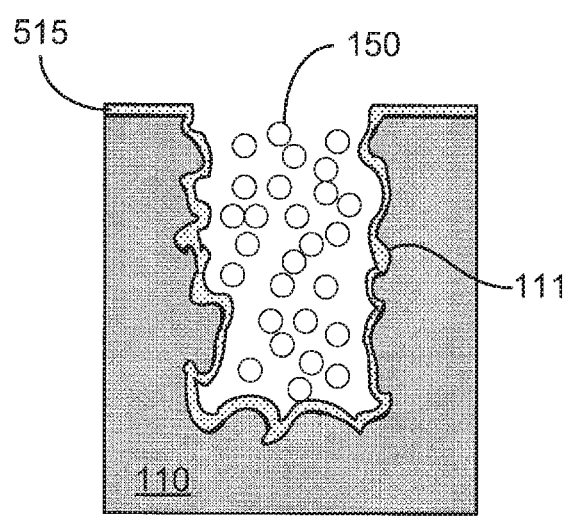
FIG. 5 is a cross-sectional side view illustration of a layer between the electrolyte and porous structure of an energy storage device according to an embodiment of the invention.

In some embodiments, a dielectric layer 515 may be placed between the electrolyte 150 and the channel 111 of the porous structure 110 as illustrated in FIG. 5. The EDL is not shown in FIG. 5 in order to avoid unnecessarily complicating the drawing. The dielectric layer 515 may be introduced to further enhance the capacitance of the energy storage device, or for other reasons such as, but not limited to, surface passivation and wettability enhancement.

In some embodiments, both a dielectric layer and conducting coating may be placed between the electrolyte and at least some of the channels. By using two layers it allows for each layer to be optimized independently for specific parameters. For example, the dielectric layer may be optimized to provide good surface passivation where as the conductive layer may be optimized to provided low ESR.

As previously described, embodiments of the invention provide versatile methods that simplify integration of energy storage devices, for example into packages and casings of electronic devices. For example, energy storage devices may be integrated into the casing of a mobile telephone, laptop or tablet, or integrated into the structure of a mobile telephone, laptop or tablet. For example, this may be accomplished by forming the energy storage device on the casing, or laminating the casing over the energy storage device.

Figure 6:
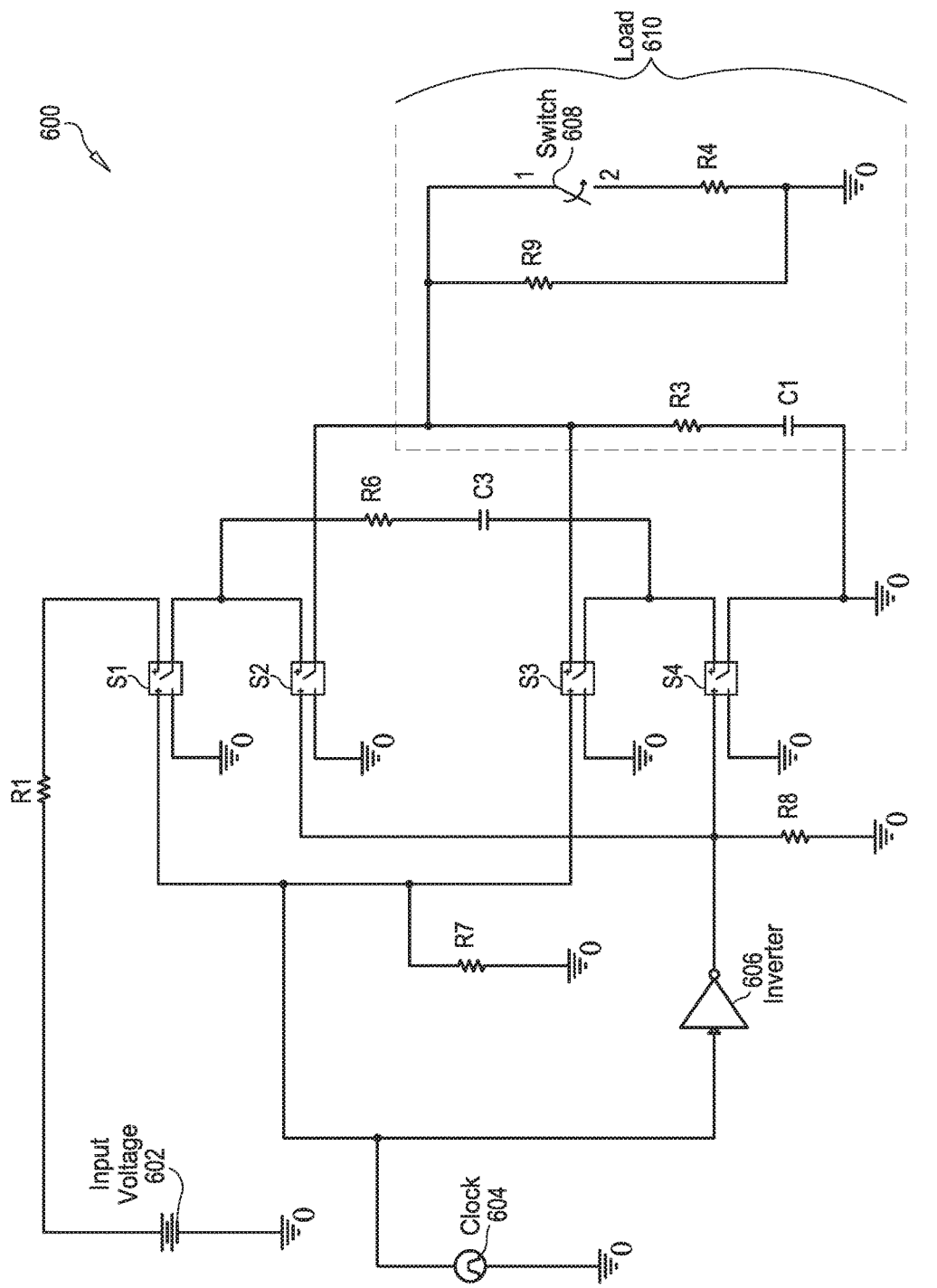
FIG. 6 illustrates a circuit diagram of a switched capacitor circuit according to embodiments of the invention.

FIG. 6 illustrates a circuit diagram of a switched capacitor circuit according to embodiments of the invention. The switched capacitor circuit 600 includes an input voltage 602 (e.g., 5 volts), a clock signal 604 (e.g., V1=0 volts, V2=5 volts, TD=0, Trise=1 nanosecond, Tfall=1 nanosecond, Pulse width=100 milliseconds, and PER=200 milliseconds), an inverter 606 to invert the clock signal, resistors R1 (e.g., 1 milliohm), R3 (e.g., 100 milliohm), R4 (e.g., 2 ohm), R6 (e.g., 50 milliohm), R7 (e.g., 10 kiloohm), R8 (e.g., 10 kiloohm) and R9 (e.g., 1 kiloohm). Generic switches S1-S4 (e.g., transistor, diode, MOSFET, etc.) allow the circuit to switch between charging and discharging modes for the electrochemical capacitors C3 (e.g., 2 farad) and C1 (e.g., 1 farad). The switches may have a 5 milliohm RDSon assumed. In one embodiment, the load 610 includes C1, R3, R9, and R4. R9 represents a constant load while R4 represents a transient load depending on the position of the switch 608. The capacitances of C1 and C3 may be very high (e.g., at least 1 millifarad) and hold charge for a long time period. If desired, one could add regular multilayer chip ceramic capacitors (e.g., 20 microfarad) in parallel with C1 and C3.

Figure 7:
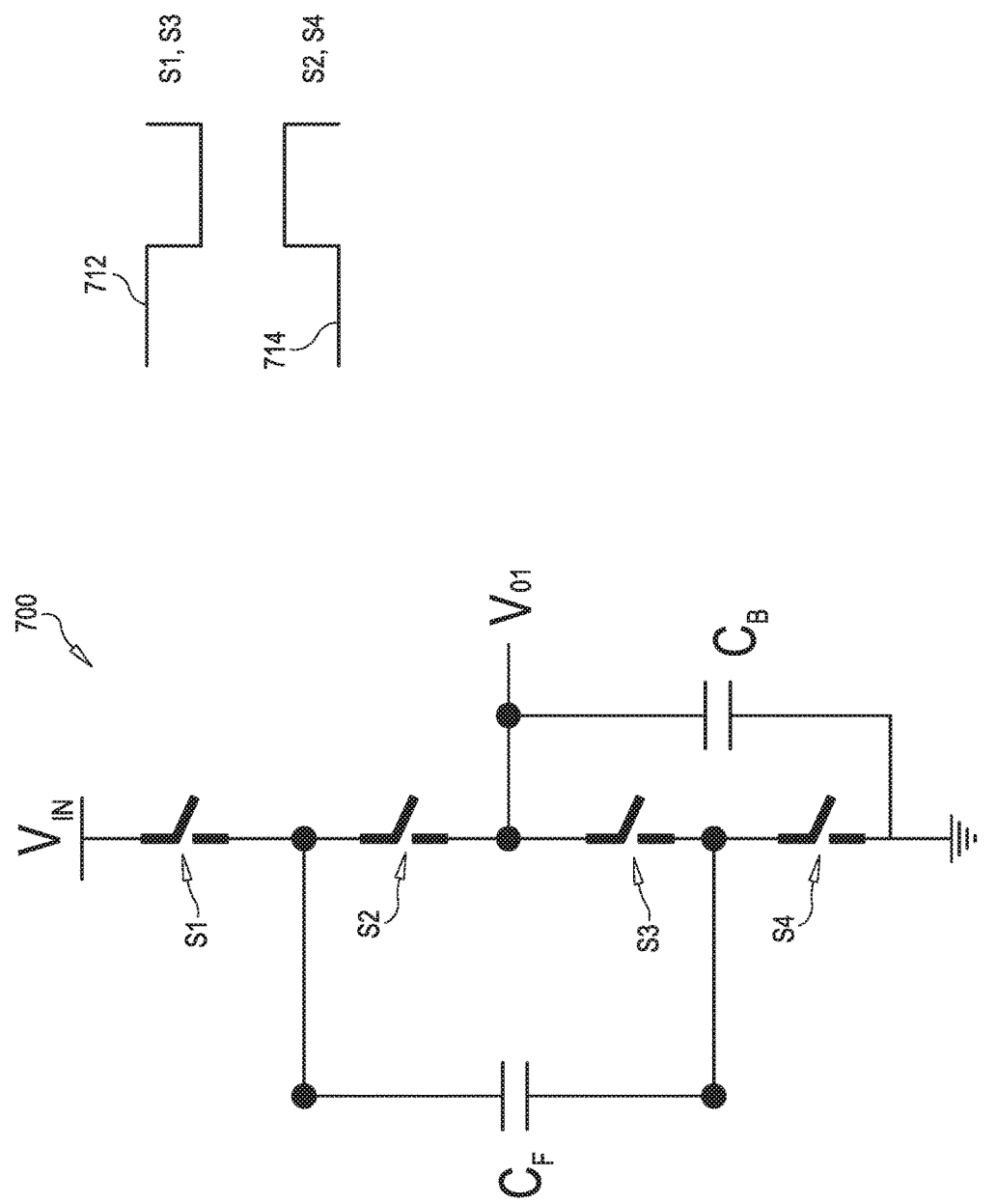
FIG. 7 illustrates a circuit diagram of a switched capacitor circuit according to embodiments of the invention.

FIG. 7 illustrates a circuit diagram of a voltage divider circuit according to embodiments of the invention. The voltage divider circuit 700 is a simplified version of the circuit 600. The electrochemical capacitor CF corresponds to C3 of FIG. 6 and the electrochemical capacitor CB corresponds to C1 of FIG. 6. In one embodiment, the output voltage VO1 is equal to approximately one half of the input voltage Vin for the 2:1 voltage divider circuit 700. S1 and S3 are closed when the clock signal 712 is high (logic one) and open when the clock signal 712 is low (logic zero). S2 and S4 are closed when the clock signal 714 is high (logic one) and open when the clock signal 714 is low (logic zero). The voltage divider circuit may have a duty cycle of 50%.

Figure 9:
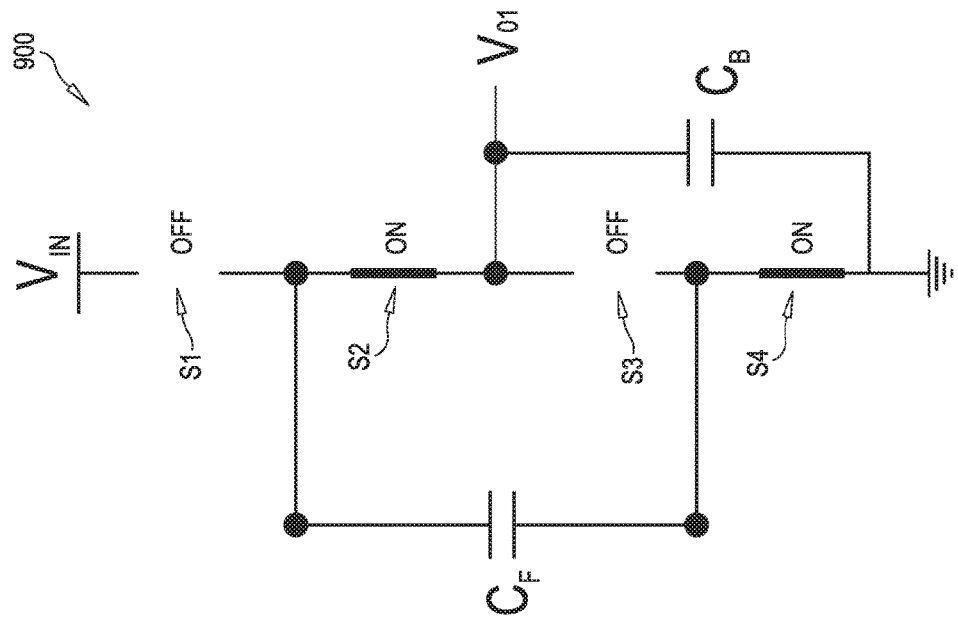
FIGS. 8 and 9 illustrate an equivalent circuit diagram of a switched capacitor circuit showing modes of operation according to an embodiment of the invention.
Figure 8:
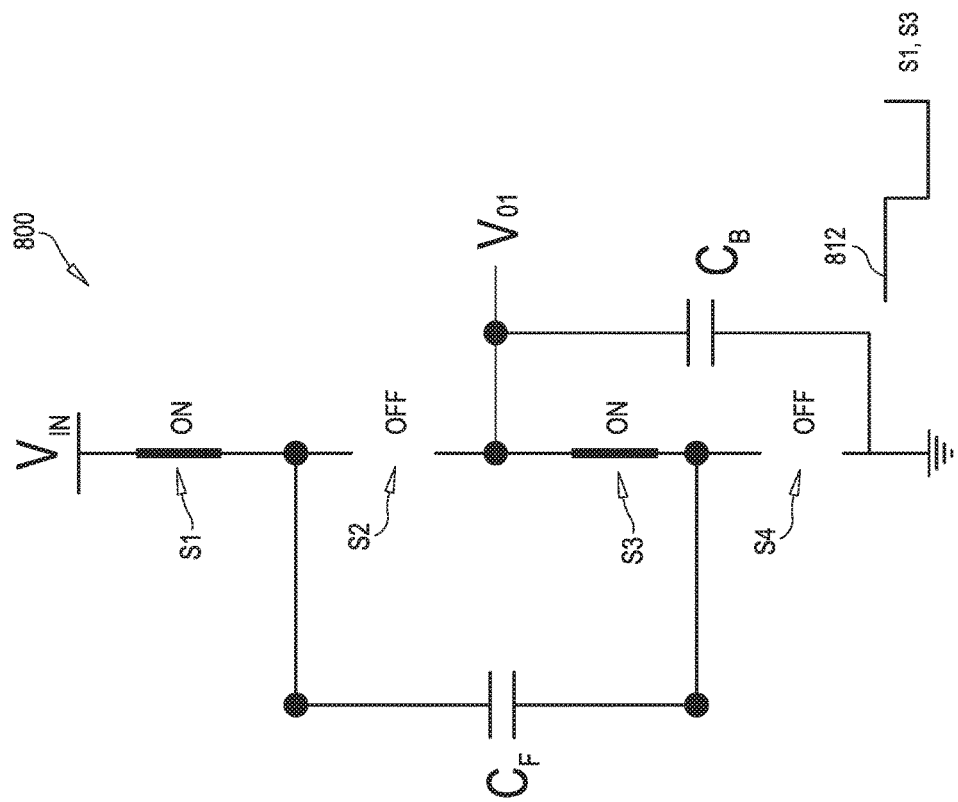

FIGS. 8 and 9 illustrate an equivalent circuit diagram of a voltage divider circuit showing modes of operation according to an embodiment of the invention. The circuit 800 shows the charging mode of circuit 700 with switches S1 and S3 being in a closed position and switches S2 and S4 being in an open position based on the clock signals 812 and 814. The circuit 900 shows the discharging mode of circuit 700 with switches S2 and S4 being in a closed position and S1 and S3 being in an open position based on the clock signals. In one embodiment, the output voltage VO1 is equal to approximately one half of the input voltage Vin for the 2:1 voltage divider circuits 800 and 900.

A simulation is performed for the circuit 600 using a switching frequency of 5 Hz with one floating electrochemical capacitor C3 of 1 farad and an output capacitor C1 of 1 farad with a 100 millisecond RC time constant. The simulation uses a load di/dt of 1.2 A/microsecond and is a discrete implementation that uses a behavioral model. Generic switches have a 5 mohm RDSon assumed. If required, one could add regular multilayer chip ceramic capacitors at the output to handle di/dt events. In actuality, the switched capacitor VR should have a high di/dt since there is no inductor to limit the rise of current.

Figure 10:
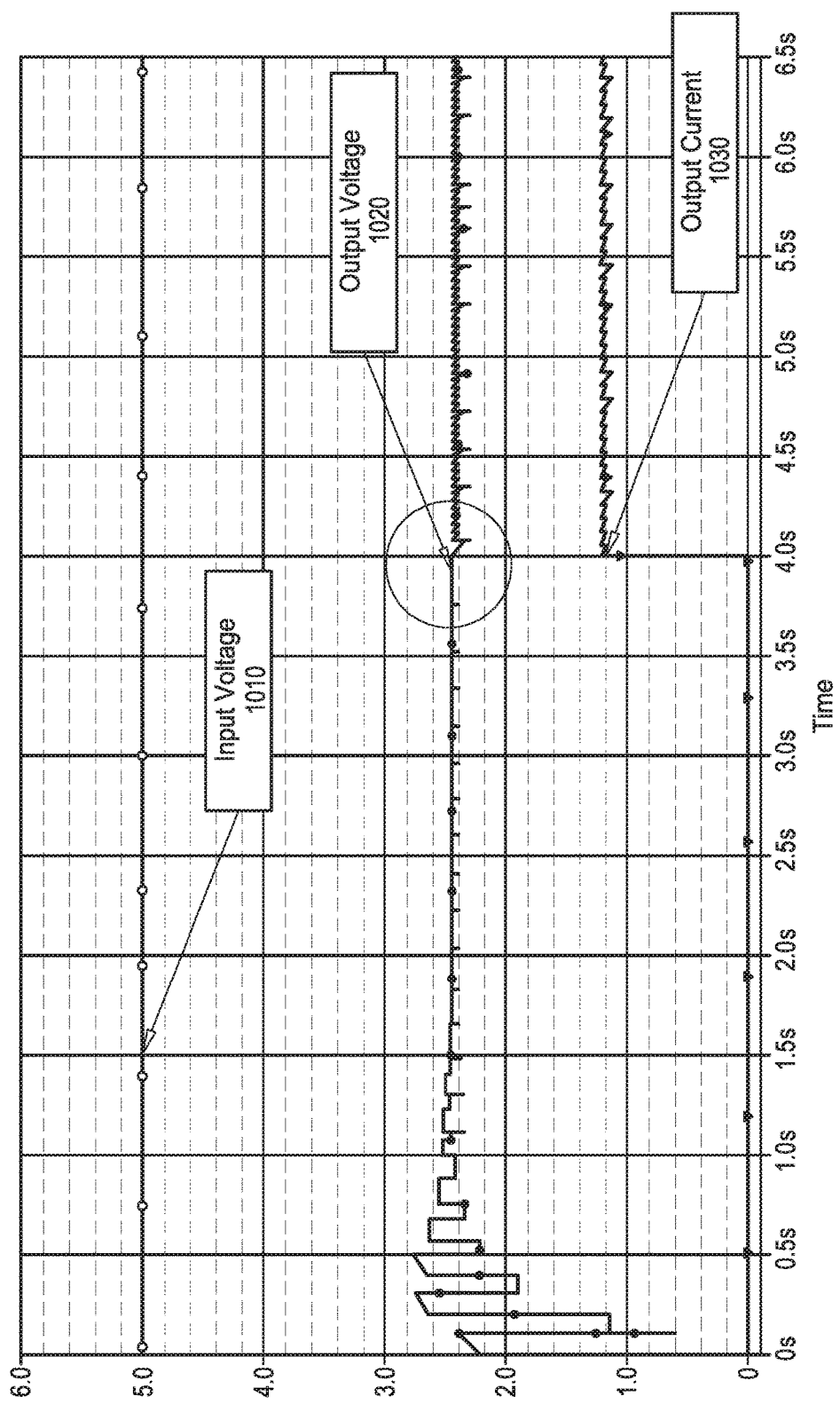
FIGS. 10 and 11 illustrate input and output waveforms of a switched capacitor circuit according to other embodiments of the invention.
Figure 11:
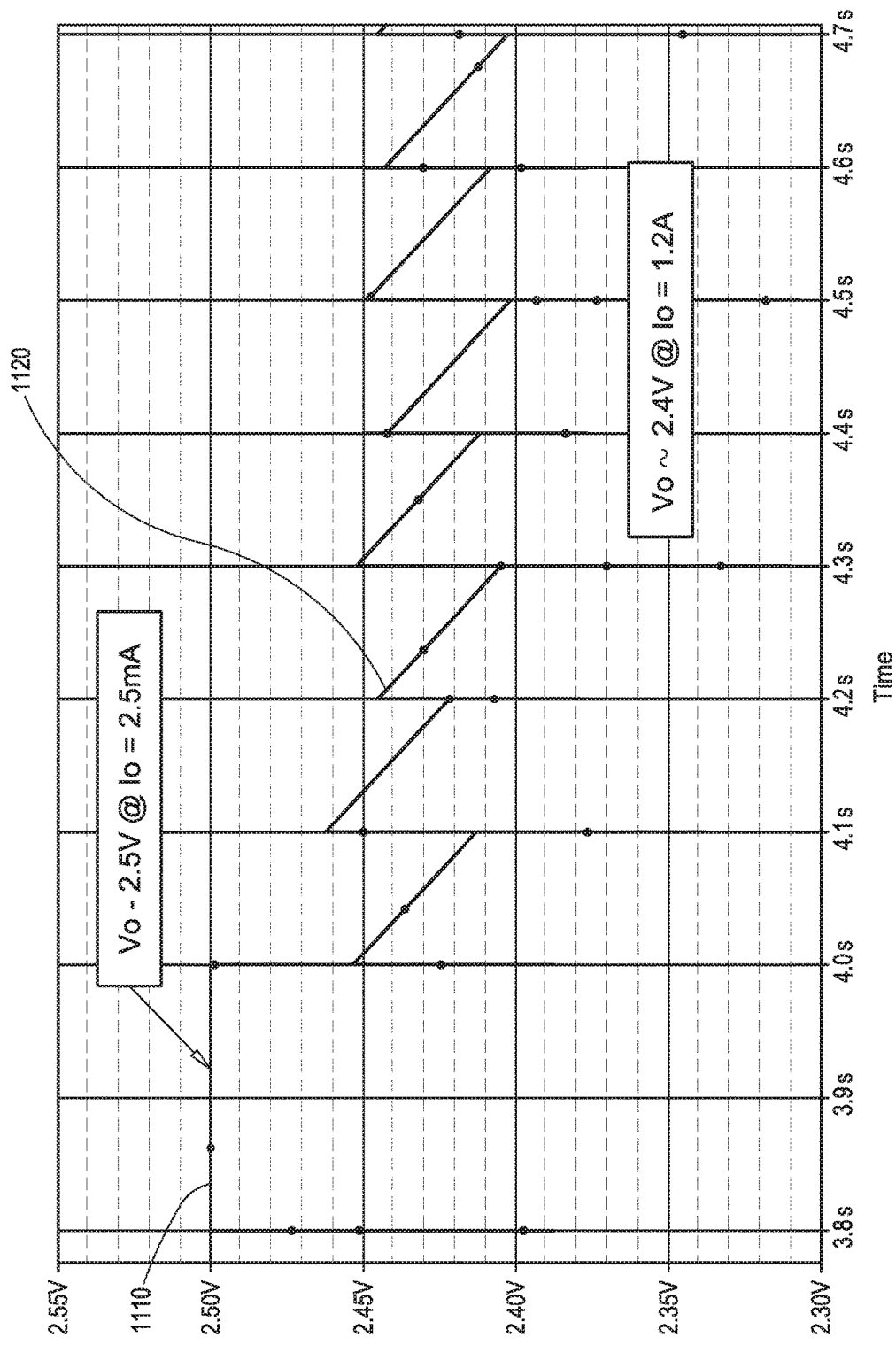

FIGS. 10 and 11 illustrate input and output waveforms of a switched capacitor circuit according to embodiments of the invention. The input and output waveforms were generated by the simulation of the circuit 600. FIG. 10 illustrates that the input voltage signal 1010 is approximately 5 volts and the output voltage signal 1020 is approximately 2.5 volts with an output current 1030 that rises from 2.5 mA to 1.2 A at a time of 4 seconds based on the switch 608 of FIG. 6 closing, which reduces the load resistance and increases the output current.

FIG. 11 illustrates that the output voltage signal 1110 is approximately 2.5 volts for an output current of approximately 2.5 mA and the output voltage signal is approximately 2.4 volts for a ripple voltage 1120 with an output current of 1.2 A at a time of 4 seconds based on the switch 608 of FIG. 6 closing, which reduces the load resistance and increases the output current.

In one embodiment, a circuit such as the circuits described herein include a first electrochemical capacitor that charges to an input voltage when coupled to an input voltage source with a switch and a second electrochemical capacitor that is coupled to the first electrochemical capacitor. The second electrochemical capacitor may be an output capacitor associated with an output voltage of the circuit. Each electrochemical capacitor may have a capacitance of at least one millifarad (mF) and a switching frequency that is less than one kilohertz or less than one hundred hertz. Each electrochemical capacitor may include a pair of porous semiconductor structures with each porous semiconductor structure containing an electrolyte loaded into a plurality of pores and a solid or semi-solid electrolyte layer separating the pair of porous semiconductor structures and penetrating the pair of porous semiconductor structures. Alternatively, the porous semiconductor structures can be replaced with activated carbon or other porous materials. Each electrochemical capacitor may have an ultra-low effective series resistance based on the pores or channels being formed in a planar structure having shallow pores or channels (e.g., 1 to 25 microns). The shallow pores or channels reduce the distance that the ionic charge carriers need to travel resulting in the ultra-low effective series resistance (e.g., 0.001 to 1 ohm). Each electrochemical capacitor may be integrated monolithically with the circuit or located externally from the circuit. The output voltage of the circuit is approximately equal to the input voltage multiplied by a fixed ratio, which may be chosen from the following ratios: 1/2, 2/3, and 1/3.

In an embodiment, the circuit includes a multi-phase converter. In another embodiment, the circuit includes a multi-phase boost converter. The parameters of each electrochemical capacitor are designed based on the requirements of the circuit with the designable parameters including voltage, effective series resistance, quality factor, and size. For example, if a design only needs capacitors with a capacitance of 100 microfarad, then the capacitors could be designed with the porous semiconductor structures being planar and having shallow pores or channels. This would reduce the effective series resistance to an ultra-low value. A converter circuit can switch into an active state to address a circuit need such as addressing a voltage or power supply droop.

Figure 12:
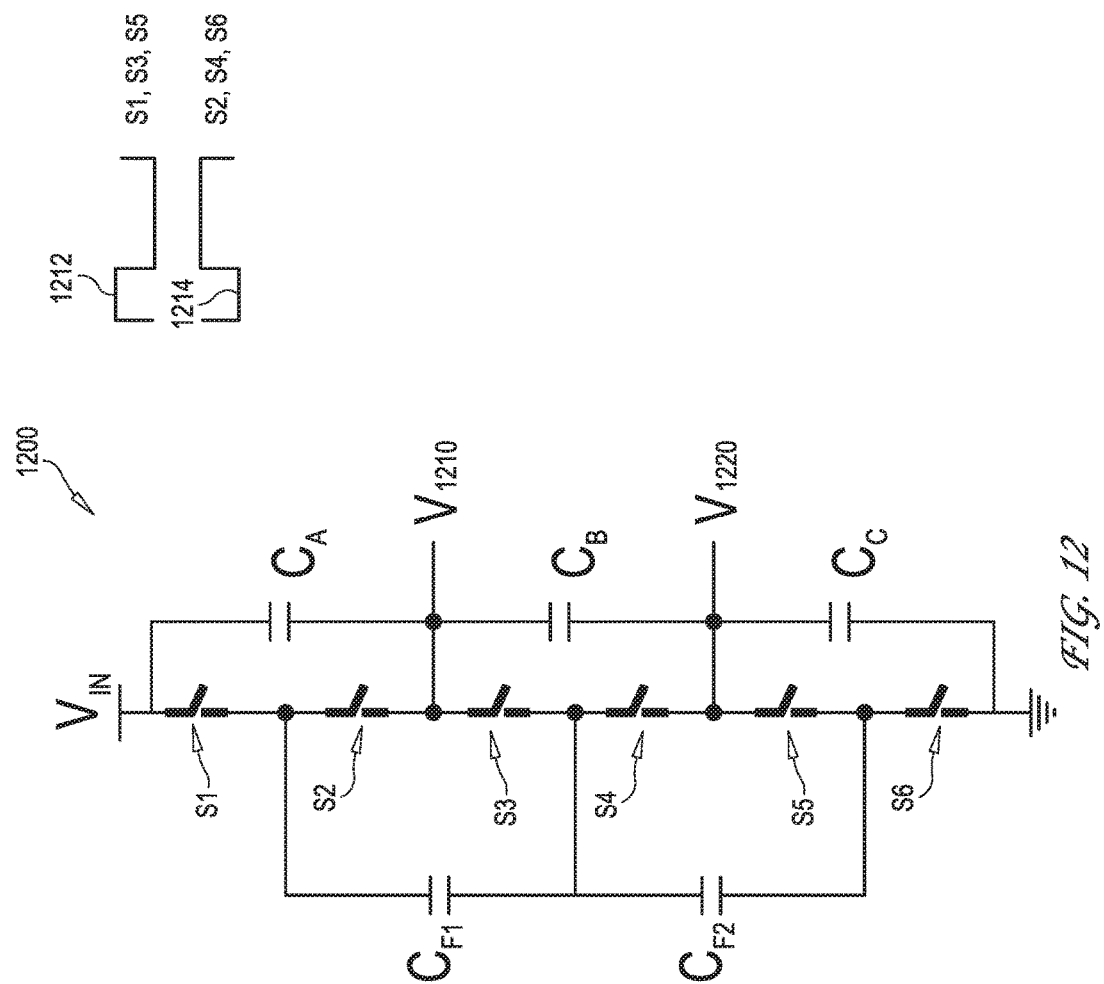
FIG. 12 illustrates a circuit diagram of a voltage divider circuit according to other embodiments of the invention.

FIG. 12 illustrates a circuit diagram of a voltage divider circuit according to other embodiments of the invention. The voltage divider circuit 1200 is a modified version of the circuit 700. The electrochemical capacitors CF1 and CF2 have replaced CF of FIG. 7 and the electrochemical capacitors CA, CB, and CC have replaced CB of FIG. 7. In one embodiment, the output voltage V1210 is equal to approximately two thirds of the input voltage Vin and the output voltage V1220 is equal to approximately one third of the input voltage Vin for the voltage divider circuit 1200. Switches S1, S3, and S5 may be closed when the clock signal 1212 is high (logic one) and open when the clock signal 1212 is low (logic zero). Switches S2, S4, and S6 may be closed when the clock signal 1214 is high (logic one) and open when the clock signal 1214 is low (logic zero). The voltage divider circuit may have a duty cycle of approximately 33%.

Figure 13:
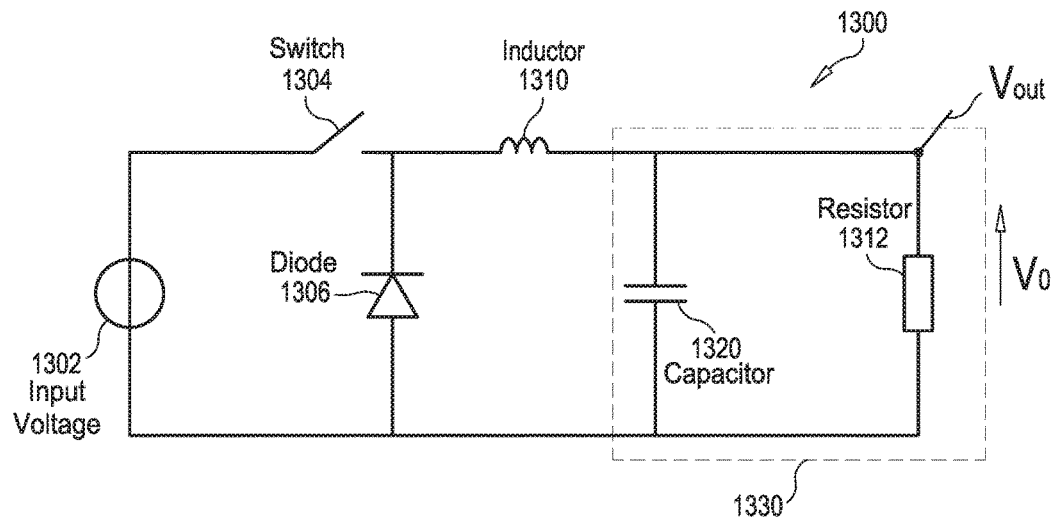
FIG. 13 illustrates a circuit diagram of a buck converter circuit according to one embodiment of the invention.

FIG. 13 illustrates a circuit diagram of a buck converter circuit according to one embodiment of the invention. The buck converter circuit 1300 includes an input voltage source 1302, a switch 1304 (e.g., transistor switch), a commutating diode 1306, an inductor 1310, a resistor 1312, and an electrochemical capacitor 1320. Commutation refers to the reversal of voltage polarity or current direction. The purpose of the commutating diode 1306 is to act whenever voltage reverses polarity. A buck converter is a step-down DC to DC converter. The two switches 1304 and 1306 control the inductor 1310. The circuit 1300 alternates between connecting the inductor 1310 to the input source voltage to store energy in the inductor when the switch 1304 is closed and the switch 1306 is open and discharging the inductor into the load 1330, which includes the capacitor 1320 and the resistor 1312, when the switch 1304 is open and the switch 1306 is closed.

Figure 14:
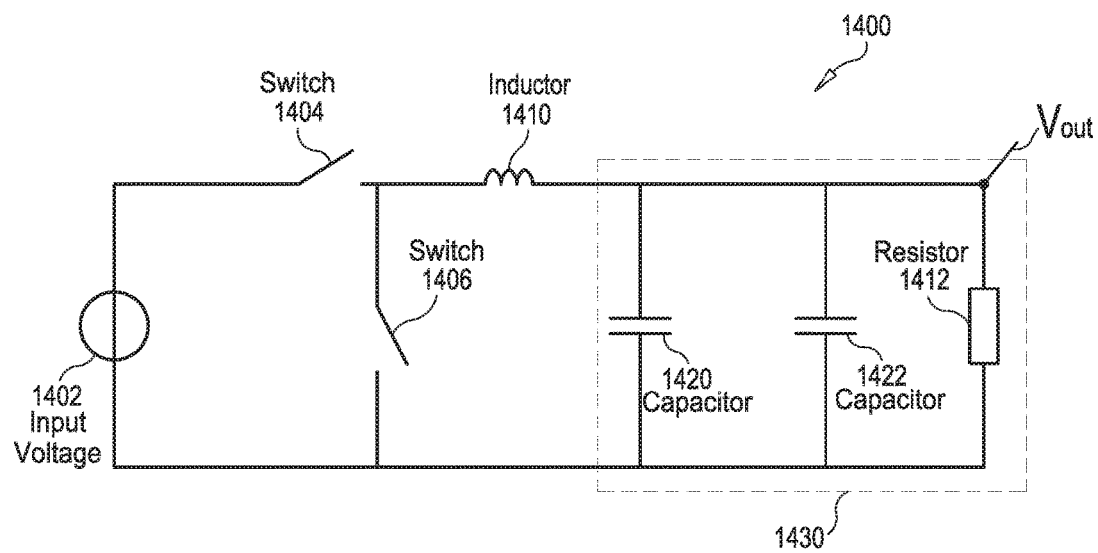
FIG. 14 illustrates a circuit diagram of a buck converter circuit according to another embodiment of the invention.

FIG. 14 illustrates a circuit diagram of a buck converter circuit according to another embodiment of the invention. The buck converter circuit 1400 includes an input voltage source 1402, a switch 1404 (e.g., transistor switch), a switch 1406 (e.g., transistor switch), an inductor 1410, a resistor 1412, an electrochemical capacitor 1420, and a capacitor 1422. The two switches 1404 and 1406 control the inductor 1410. The circuit 1400 alternates between connecting the inductor 1410 to the input source voltage to store energy in the inductor when the switch 1404 is closed and the switch 1406 is open and discharging the inductor into the load 1430, which includes the capacitors and the resistor 1412, when the switch 1404 is open and the switch 1406 is closed.

In one embodiment, a power converter circuit (e.g., buck converter circuit) includes an inductor to charge when coupled to an input voltage during a first state and to discharge during a second state. A load is coupled to the inductor. The load includes at least one electrochemical capacitor coupled in parallel to a resistor. An output voltage of the power converter circuit is less than the input voltage. The at least one electrochemical capacitor has a capacitance of at least one millifarad (mF) and a switching frequency that is less than one kilohertz. The at least one electrochemical capacitor may be integrated monolithically with the power converter circuit. The load may include an electrochemical capacitor that is coupled in parallel with a capacitor. The electrochemical capacitor may be designed for low frequency performance (e.g., less than 1 kilohertz) and the capacitor may be designed for high frequency performance.

Figure 15:
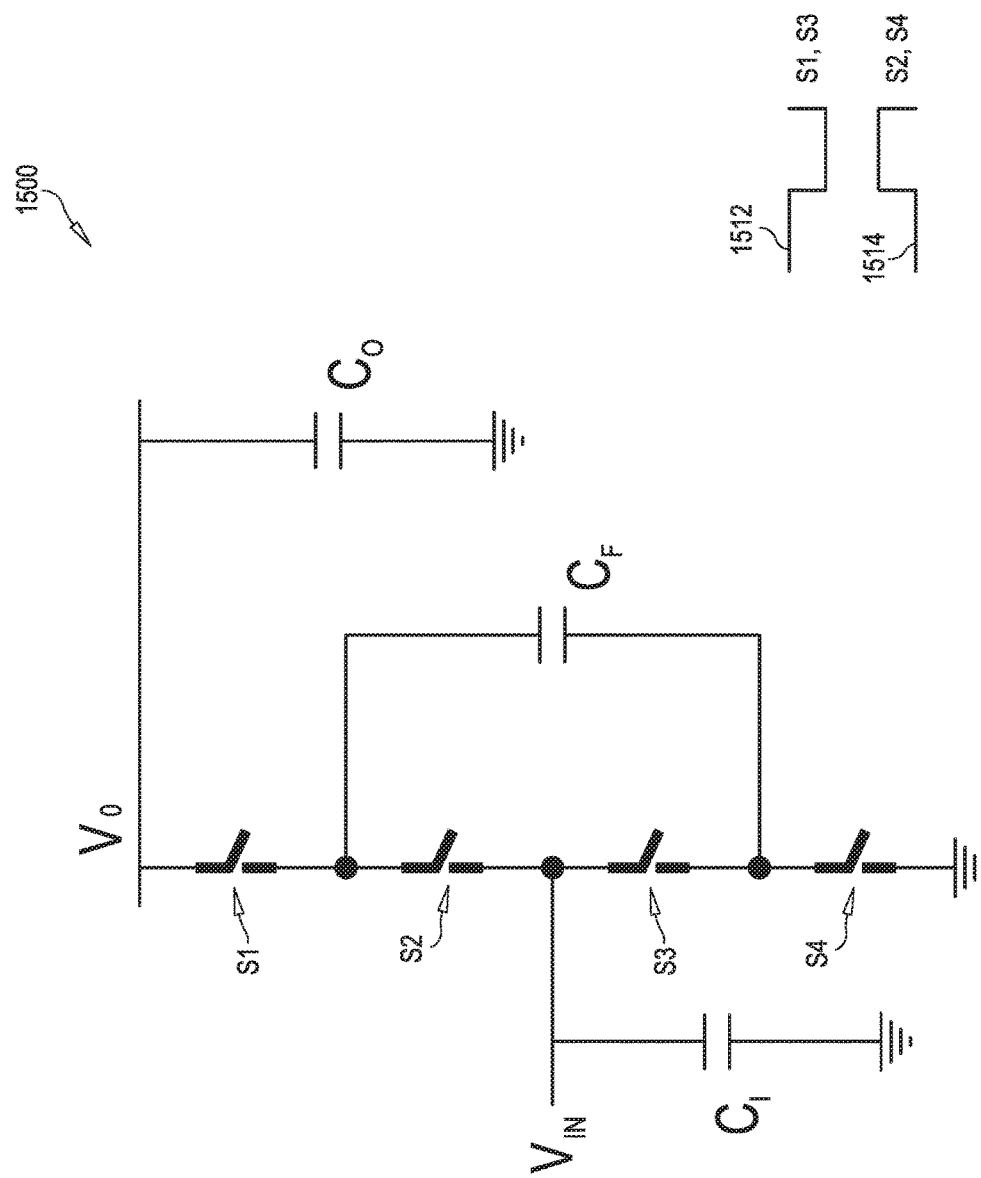
FIG. 15 illustrates a circuit diagram of a voltage doubler circuit according to one embodiment of the invention.

FIG. 15 illustrates a circuit diagram of a voltage doubler circuit according to one embodiment of the invention. The voltage doubler circuit 1500 is a modified version of the circuit 700. The circuit 1500 includes an input electrochemical capacitor CI, an electrochemical capacitor CF that is across switches S2 and S3, and the output electrochemical capacitor CO. In one embodiment, the output voltage Vo is equal to approximately two times the input voltage Vin. Switches S1 and S3 may be closed when the clock signal 1512 is high (logic one) and open when the clock signal 1512 is low (logic zero). Switches S2 and S4 may be closed when the clock signal 1514 is high (logic one) and open when the clock signal 1514 is low (logic zero). The voltage doubler circuit may have a duty cycle of approximately 50%.

Figure 16:
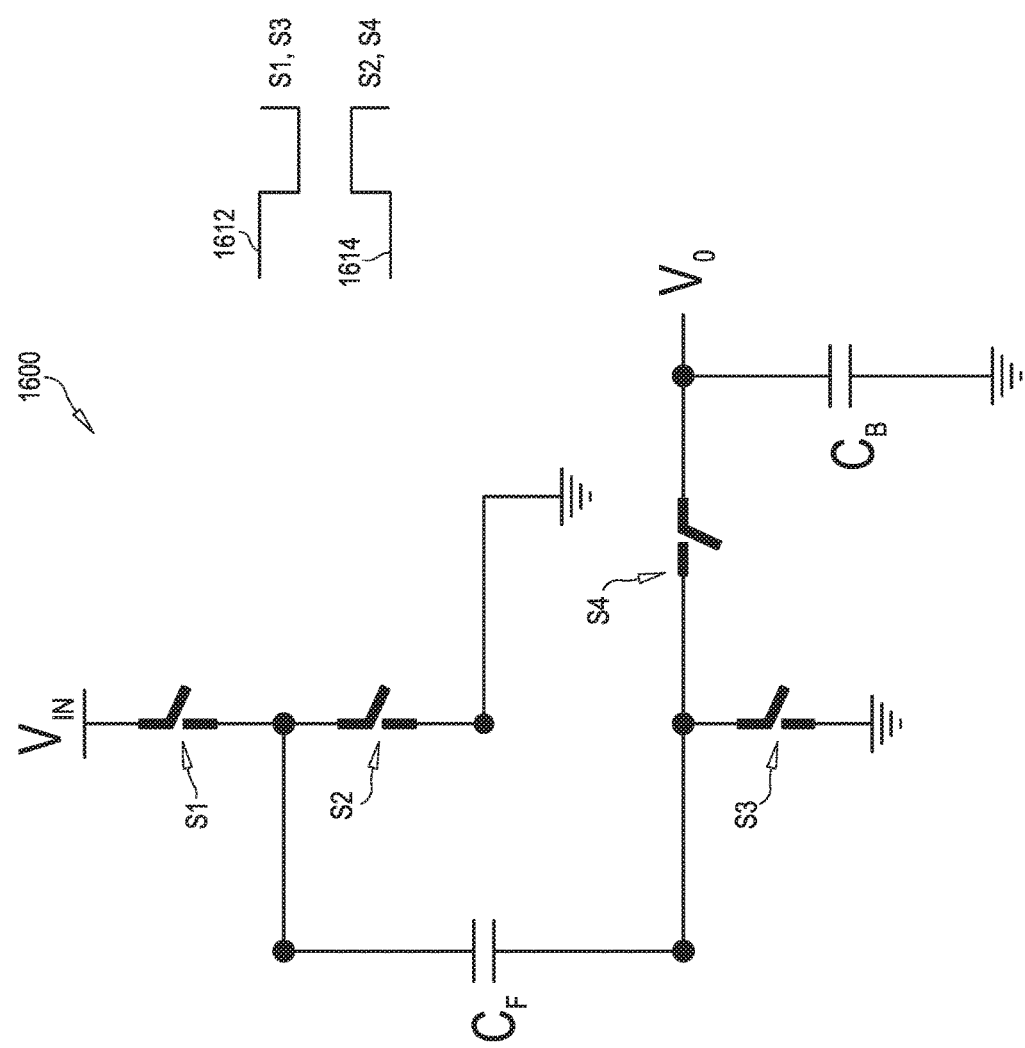
FIG. 16 illustrates a circuit diagram of a voltage inverter circuit according to one embodiment of the invention.

FIG. 16 illustrates a circuit diagram of a voltage inverter circuit according to one embodiment of the invention. The voltage inverter circuit 1600 is a modified version of the circuit 700. The circuit 1600 includes an electrochemical capacitor CF and the output electrochemical capacitor CB. In one embodiment, the output voltage Vo is equal to approximately an inverted input voltage Vin (i.e., Vo=−Vin). Switches S1 and S3 may be closed when the clock signal 1612 is high (logic one) and open when the clock signal 1612 is low (logic zero). Switches S2 and S4 may be closed when the clock signal 1614 is high (logic one) and open when the clock signal 1614 is low (logic zero). The voltage inverter circuit may have a duty cycle of approximately 50%.

Figure 17:
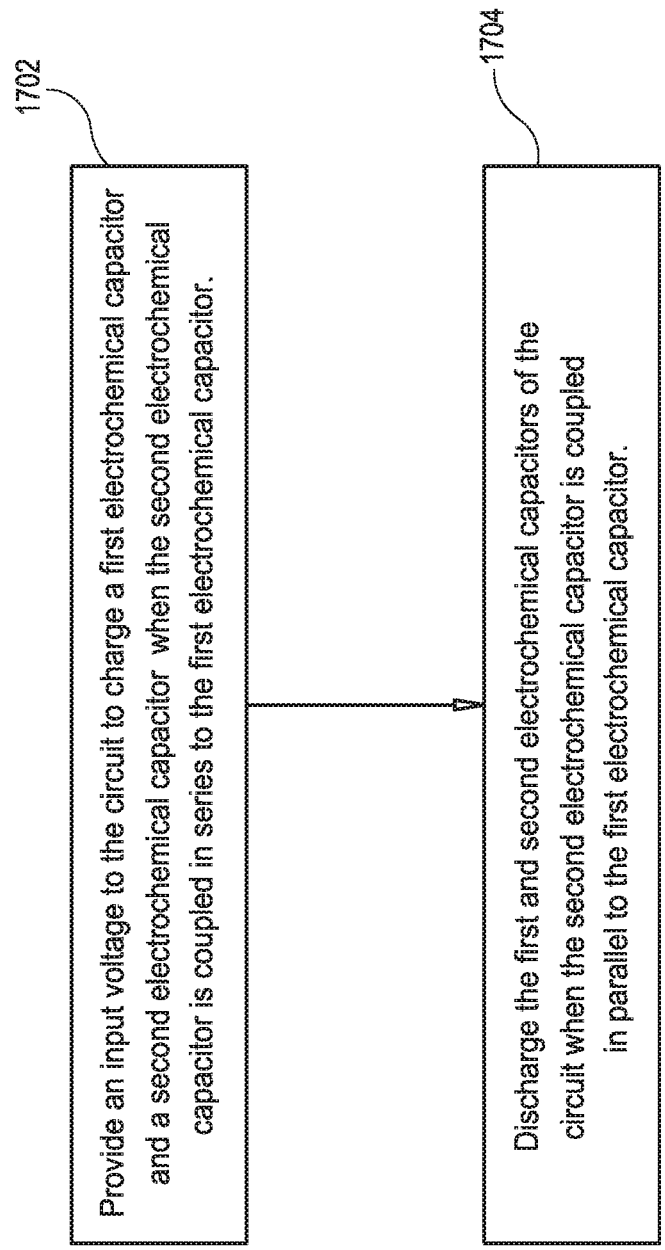
FIG. 17 is a flowchart illustrating a method of operating a switched capacitor circuit according to an embodiment of the invention.

FIG. 17 is a flowchart illustrating a method of operating a switched capacitor circuit according to an embodiment of the invention. The method 1700 is performed by processing logic that may include hardware (circuitry, dedicated logic, etc.), software (such as is run on a general purpose computer system or a dedicated machine or a device), or a combination of both. In one embodiment, the method 1700 is performed by processing logic associated with the circuits (e.g., circuit 700), devices or systems discussed herein.

At block 1702, an input voltage is provided to the circuit to charge a first electrochemical capacitor and a second electrochemical capacitor when the second electrochemical capacitor is coupled in series to the first electrochemical capacitor. At block 1704, the first and second electrochemical capacitors of the circuit are discharged when the second electrochemical capacitor is coupled in parallel to the first electrochemical capacitor. Each electrochemical capacitor may have a capacitance of at least one millifarad (mF) and a switching frequency that is less than one kilohertz. Each electrochemical capacitor may have a switching frequency that is less than one hundred hertz or alternatively less than ten hertz. In one embodiment, the output voltage of the circuit is approximately equal to the input voltage multiplied by a fixed ratio that is chosen from the following ratios: 1/2, 2/3, and 1/3.

Figure 18:
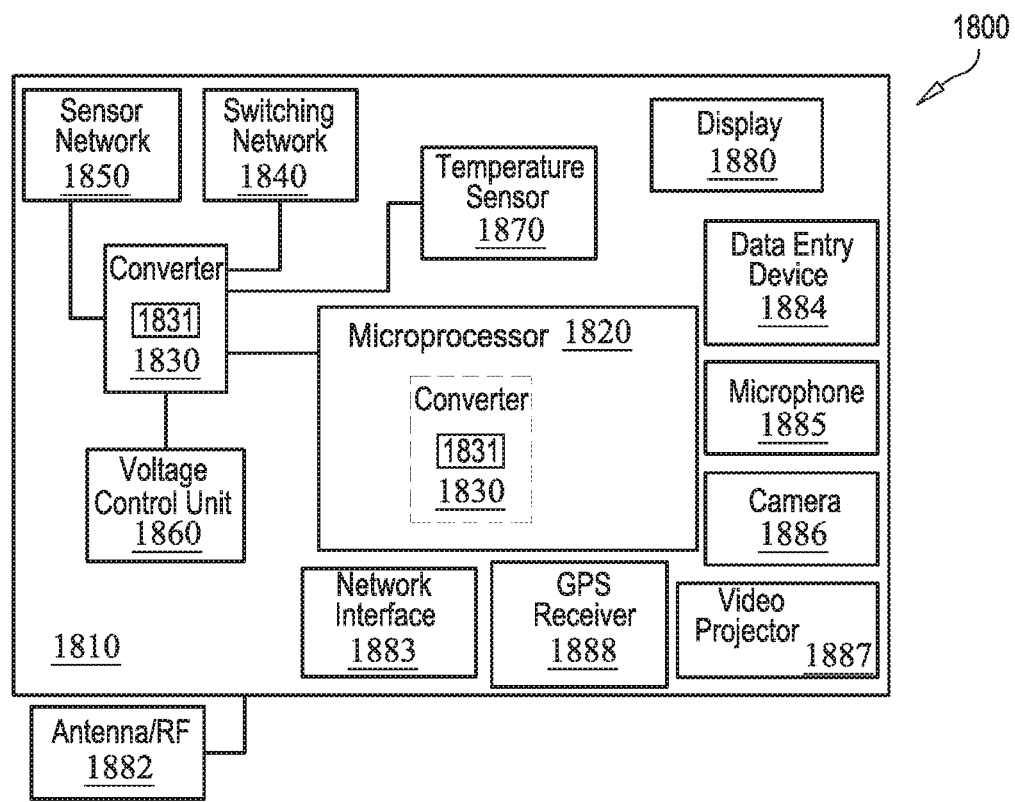
FIG. 18 is a block diagram illustration of a mobile electronic device according to an embodiment of the invention.

FIG. 18 is a block diagram representing a mobile electronic device 1800 according to an embodiment of the invention. As illustrated in FIG. 18, mobile electronic device 1800 includes a substrate 1810 on which a microprocessor 1820 and a converter 1830 (e.g., converter circuit, switched capacitor circuit, circuit 600, circuit 700, circuit 800, circuit 900, circuit 1200, circuit 1300, circuit 1400, circuit 1500, circuit 1600, etc.) having an energy storage device 1831 associated with microprocessor 1820 are disposed. The converter 1830 and energy storage device 1831 can be located on substrate 1810 away from microprocessor 1820, as illustrated in solid lines. The converter having energy storage device can also be located on or underneath microprocessor 1820 itself, as illustrated in dashed lines. In one embodiment, energy storage device 1831 includes first and second electrically conductive structures separated from each other by solid or semi-solid electrolyte layer. In an embodiment, the solid or semi-solid electrolyte layer penetrates a porous structure of either or both of the first and second electrically conductive structures. In an embodiment, one of the first and second electrically conductive structures includes a porous structure containing multiple channels. As an example, this embodiment can be similar to one or more of the embodiments shown in FIGS. 1-5 and described in the accompanying text.

In at least some embodiments, energy storage device 1831 is one of a plurality of energy storage devices, (all of which are represented in FIG. 18 by block 1831) contained within mobile electronic device 1800. In one or more of those embodiments, mobile electronic device 1800 further includes a switching network 1840 associated with the energy storage devices. When a capacitor is being discharged it doesn't maintain a constant voltage but instead decays in an exponential manner (unlike a battery where the voltage stays relatively constant during discharge). Switching network 1840 includes circuitry or some other mechanism that switches in and out various capacitors such that a relatively constant voltage is maintained. For example, the energy storage devices could initially be connected to each other in parallel and then, after a certain amount of voltage decay, a subset of the energy storage devices could be changed by the switching network so as to be connected in series such that their individual voltage contributions can boost the declining overall voltage. In one embodiment, switching network 1840 could be implemented using existing silicon device technology as used in the art (e.g., transistors, silicon controlled rectifiers (SCRs), etc.), while in other embodiments it could be implemented using microelectromechanical systems (MEMS) relays or switches (which, it may be noted, tend to have very low resistance).

In some embodiments, mobile electronic device 1800 further includes a sensor network 1850 associated with energy storage devices 1831. In at least some embodiments, each one of the energy storage devices will have its own sensor that indicates certain behavioral parameters of the energy storage device. For example, the sensors may indicate existing voltage levels as well as the ongoing discharge response, both of which are parameters that may be used by the switching network—especially in cases where the dielectric material (or other electrical insulator) being used is not linear but rather has a dielectric constant that varies with the voltage. In those cases, it may be advantageous to include along with the sensor network a finite state machine such as a voltage control unit 1860 that knows what the behavior of the dielectric is and responds accordingly. A voltage control unit that knows how the dielectric behaves can compensate for any non-linearity. A temperature sensor 1870 associated with energy storage devices 1831 may also be included in order to sense temperature (or other safety-related parameters). In certain embodiments of the invention, mobile electronic device 1800 further includes one or more of: a display 1881, antenna/RF elements 1882, a network interface 1883, a data entry device 1884 (e.g., a keypad or a touchscreen), a microphone 1885, a camera 1886, a video projector 1887, a global positioning system (GPS) receiver 1888, and the like.

Figure 19:
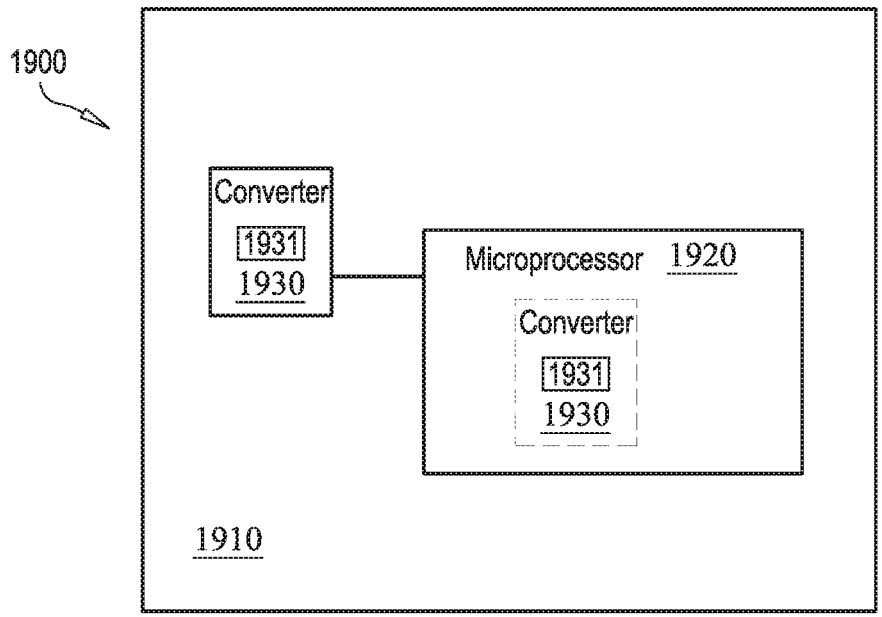
FIG. 19 is a block diagram illustration of a microelectronic device according to an embodiment of the invention.

FIG. 19 is a block diagram representing a microelectronic device 1900 according to an embodiment of the invention. As illustrated in FIG. 19, microelectronic device 1900 includes a substrate 1910, a microprocessor 1920 over substrate 1910, and converter 1930 that is associated with microprocessor 1920. The converter 1930 (e.g., converter circuit, switched capacitor circuit, circuit 600, circuit 700, circuit 800, circuit 900, circuit 1200, circuit 1300, circuit 1400, circuit 1500, circuit 1600, etc.) includes an energy storage device 1931. The converter and energy storage device can either be located on substrate 1910 away from microprocessor 1920 (e.g., a die-side capacitor, or on a silicon bridge), as illustrated in solid lines, or it can be located on or underneath microprocessor 1920 itself (e.g., in a build-up layer above the microprocessor), as illustrated in dashed lines. Energy storage device can also be integrated into a casing of the microelectronic device.

In one embodiment, a processor (e.g., microprocessor 1920) includes a converter circuit 1930 to provide a power supply to the processor. The converter circuit includes a first electrochemical capacitor that charges to an input voltage when coupled to an input voltage with a switch in a closed position and a second electrochemical capacitor that is coupled to the first electrochemical capacitor. The second electrochemical capacitor provides an output voltage to be used as the power supply. Each electrochemical capacitor may have a capacitance of at least one millifarad (mF). Each electrochemical capacitor may have a switching frequency that is less than one kilohertz. Each electrochemical capacitor may be integrated monolithically with the processor as illustrated with the converter 1930 and energy storage device (e.g., one or more electrochemical capacitors 1931) being located within the microprocessor 1920.

The energy storage devices disclosed herein may in some embodiments be used as a decoupling capacitor within microelectronic device 1900—one that is smaller and that, for the reasons described elsewhere herein, offers much higher capacitance and much lower impedance than existing decoupling capacitors. As already mentioned, energy storage device 1930 can be part of a support integrated circuit (IC) or chip or it can be located on or underneath the microprocessor die itself. As an example, one might, according to embodiments of the invention, be able to form regions of porous silicon (or the like, as described above) on a microprocessor die and then create a high-surface-area embedded decoupling capacitor right on the substrate of the microprocessor die. Because of the porosity of the silicon, the embedded capacitor would have very high surface area. Other possible uses for the disclosed energy storage devices include use as a memory storage element (where problems with the z-direction size of embedded DRAM approaches may be solved by greatly increasing the farads per unit area) or as a component of voltage converters in voltage boost circuitry, perhaps for use with circuit blocks, individual microprocessor cores, or the like.

As an example, higher capacitance values could in this context be advantageous because parts of the circuit could then run nominally at a certain (relatively low) voltage but then in places where higher voltage is needed in order to increase speed (e.g., cache memory, input/output (I/O) applications) the voltage could be boosted to a higher value. An operational scheme of this sort would likely be preferred over one in which the higher voltage is used everywhere; i.e., in cases where only a small amount of circuitry requires a higher voltage it likely would be preferable to boost voltage from a lower baseline voltage for that small portion of the circuit rather than drop voltage from a higher baseline value for the majority of the circuitry. Future microprocessor generations may also make use of voltage converters of the type described herein. Having more capacitance available to be deployed around a package or around a microprocessor die may help solve the existing issue of intolerably high inductance between transistors that transfer voltage around a circuit.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage devices and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A power converter circuit comprising:
   an inductor to charge when coupled to an input voltage during a first state and to discharge during a second state; and
   a load coupled to the inductor, the load including at least one electrochemical capacitor coupled in parallel to a resistor, wherein the at least one electrochemical capacitor comprises a pair of porous semiconductor structures, each porous semiconductor structure containing an electrolyte loaded into a plurality of pores to simplify monolithic integration with the power converter circuit.

2. The power converter capacitor circuit of claim 1, wherein the at least one electrochemical capacitor has a capacitance of at least one millifarad (mF).

3. The power converter circuit of claim 1, wherein the at least one electrochemical capacitor has a switching frequency that is less than one kilohertz.

4. The power converter circuit of claim 1, wherein the at least one electrochemical capacitor is integrated monolithically with the power converter circuit.

5. The power converter circuit of claim 1, wherein the power converter circuit comprises a buck converter.

6. The power converter circuit of claim 1, wherein the at least one electrochemical capacitor comprises a first electrochemical capacitor that is coupled in parallel with a second electrochemical capacitor with the first electrochemical capacitor being designed for low frequency performance and the second electrochemical capacitor being designed for high frequency performance.

7. The power converter circuit of claim 1, wherein the at least one electrochemical capacitor further comprises a solid or semi-solid electrolyte layer separating the pair of porous semiconductor structures and penetrating the pair of porous semiconductor structures, wherein each electrochemical capacitor has an ultra-low effective series resistance based on the pores being planar and shallow.

8. A processor comprising:
   a converter circuit to provide a power supply to the processor, the converter circuit comprising,
   a first electrochemical capacitor to charge to an input voltage when coupled to an input voltage source; and
   a second electrochemical capacitor coupled to the first electrochemical capacitor, the second electrochemical capacitor is associated with an output voltage of the converter circuit, wherein each of the first electrochemical capacitor and second electrochemical capacitor comprises a pair of porous semiconductor structures, each porous semiconductor structure containing an electrolyte loaded into a plurality of pores to simplify monolithic integration with the converter circuit.

9. The processor of claim 8, wherein each of the first electrochemical capacitor and second electrochemical capacitor has a capacitance of at least one millifarad (mF).

10. The processor of claim 8, wherein each of the first electrochemical capacitor and second electrochemical capacitor has a switching frequency that is less than one kilohertz.

11. The processor of claim 8, wherein each of the first electrochemical capacitor and second electrochemical capacitor is integrated monolithically with the processor.

12. The processor of claim 8, wherein each of the first electrochemical capacitor and second electrochemical capacitor further comprises a solid or semi-solid electrolyte layer separating the pair of porous semiconductor structures and penetrating the pair of porous semiconductor structures, wherein each electrochemical capacitor has an ultra-low effective series resistance based on the pores being planar and shallow.

13. An electronic device comprising:
   a microprocessor, and
   a power converter circuit coupled to the microprocessor to provide a power supply to the microprocessor, the power converter circuit comprising an inductor to charge when coupled to an input voltage during a first state and to discharge during a second state and a load coupled to the inductor, the load including at least one electrochemical capacitor coupled in parallel to a resistor, wherein the at least one electrochemical capacitor comprises a pair of porous semiconductor structures, each porous semiconductor structure containing an electrolyte loaded into a plurality of pores to simplify monolithic integration with the power converter circuit.

14. The electronic device of claim 13, wherein the at least one electrochemical capacitor has a capacitance of at least one millifarad (mF).

15. The electronic device of claim 13, wherein the at least one electrochemical capacitor has a switching frequency that is less than one kilohertz.

16. The electronic device of claim 13, wherein the at least one electrochemical capacitor is integrated monolithically with the power converter circuit.

17. The electronic device of claim 13, wherein the power converter circuit comprises a buck converter.

18. The electronic device of claim 13, wherein the at least one electrochemical capacitor comprises a first electrochemical capacitor that is coupled in parallel with a second electrochemical capacitor with the first electrochemical capacitor being designed for low frequency performance and the second electrochemical capacitor being designed for high frequency performance.

19. The electronic device of claim 13, wherein the at least one electrochemical capacitor further comprises a solid or semi-solid electrolyte layer separating the pair of porous semiconductor structures and penetrating the pair of porous semiconductor structures, wherein each electrochemical capacitor has an ultra-low effective series resistance based on the pores being planar and shallow.

* * * * *